June 10, 1952 F. FISHER 2,599,621
MACHINE FOR PLUCKING FEATHERS
Filed April 2, 1949 2 SHEETS—SHEET 1
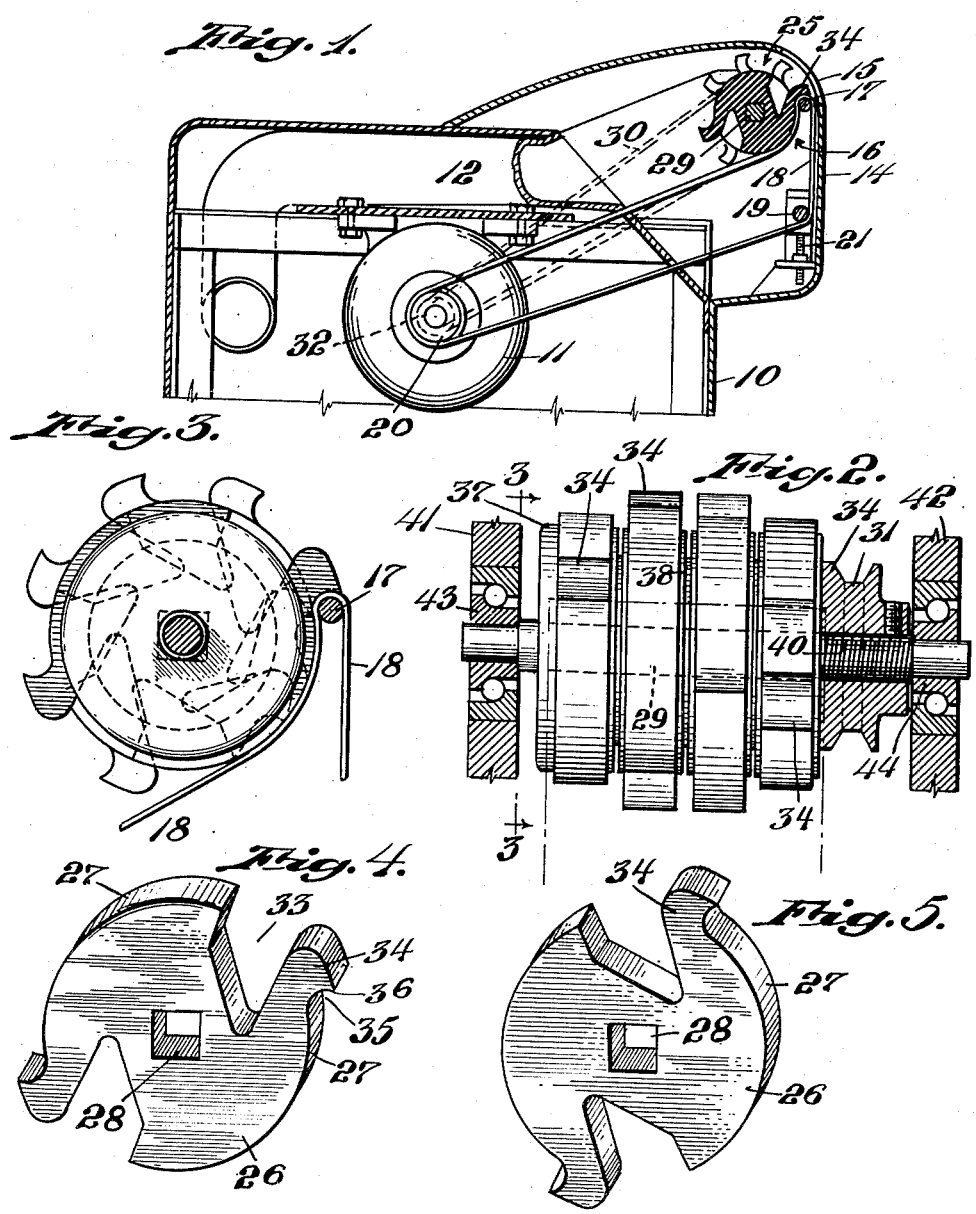
INVENTOR.
Foster Fisher
BY
Barlow & Barlow
ATTORNEYS.

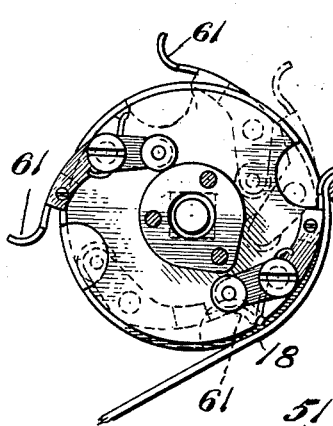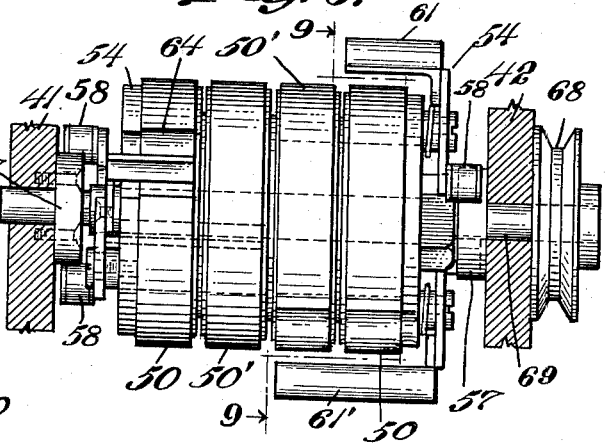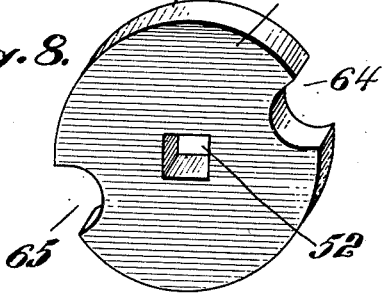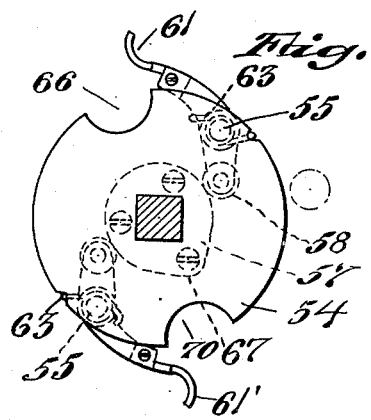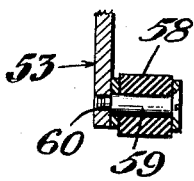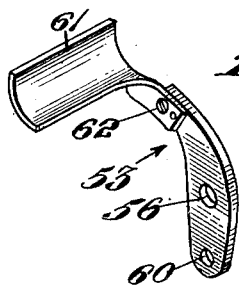

Patented June 10, 1952

2,599,621

UNITED STATES PATENT OFFICE 2,599,621

MACHINE FOR PLUCKING FEATHERS

Foster Fisher, Providence, R. I., assignor of one-half to Benjamin E. Kinne, Rehoboth, Mass.

Application April 2, 1949, Serial No. 85,213

6 Claims. (Cl. 17—11.1)

This invention relates to a machine for plucking feathers.

Various ways have been provided for plucking feathers from a bird and in most instances difficulty has been encountered in getting a grip on the small feathers close to the skin of the bird. Also, difficulty has been encountered in retaining control of the feathers as they leave the bird.

One of the objects of this invention is to provide gripping jaws for small feathers which will grip the feathers close to the skin of the bird.

Another object of this invention is to provide an arrangement so that the feathers will be held under control so that they may be conveyed as desired and discharged from the machine.

Another object of this invention is to provide means for yieldingly gripping the feathers so that the grip will be flexible to adjust itself to varying sizes of work.

Another object of this invention is to provide one of the contacting gripping jaws from a resilient material which will be quiet as movement occurs.

Another object of this invention is to provide a plurality of gripping means which are staggered so that as the grip of one means occurs the grip of other means is deferred until after the extraction of the feathers by such gripping means from the bird has been accomplished, thereby reducing the power requirement for the machine.

With these and other objects in view, the invention consists of certain novel features of construction, as will be more fully described and particularly pointed out in the appended claims.

In the accompanying drawings:

Figure 1 is a sectional view illustrating the layout of the machine and showing the gripping jaws;

Figure 2 is an elevation of the roller on a larger scale showing the arrangement of the various roller sections with the mounting bearings and driving pulley in section;

Figure 3 is a sectional view of the roller looking substantially from the line 3—3 of Figure 2 with the companion jaw in its relation thereto;

Figure 4 is a perspective view of one of the roller sections;

Figure 5 is a perspective view of another of the roller sections modified as to the relation of its center opening and its outer periphery;

Figure 6 is a view showing a modified form of roller jaw and the bearings shown in section;

Figure 7 is an end view of the showing in Figure 6 taken from the left-hand end of the roller jaw;

Figure 8 is a perspective view of one of the end roller sections of the structure shown in Figure 6;

Figure 9 is a sectional view on line 9—9 of Figure 6;

Figure 10 is a perspective view of one of the fingers associated with the roller jaw;

Figure 11 is an enlarged sectional view of the cam follower in its association with one end of the finger shown in Figure 10; and Figure 12 is an edge view of one of the fingers provided with a rubber face.

In proceeding with this invention, I have provided a travelling belt which extends in a hairpin turn over a guide and have mounted a roller adjacent this guide and in a position so that the edge or working surface will contact with the belt as the belt leaves the guide and will grip and pull feathers from a bird which is placed adjacent to these jaws. However, in order that the feathers close to the skin of the bird may be gripped, I have extended fingers outwardly from the surface of the roller and curved the ends of these fingers so as to extend about the guide as the belt passes over it, that a closer grip of the feathers at this location may be had and that they may be pulled from the bird. These fingers are flexible and may be flexed back into a recess to receive them in the roller as the roller turns in its progress or advancement of turning about its axis. Various means of providing flexible gripping fingers may be provided.

With reference to the drawings, I have provided a framework 10 which supports a motor 11, and feather removing conduit 12.

At the front of the machine there is arranged an enclosing casing 14 having an opening 15 with its edge in a form against which the bird is positioned to be plucked. A pair of jaws within the casing are arranged for the plucking.

One of these jaws 16 comprises a guide 17 which may be a cylindrical bar or roller over which a belt 18 extends in a sharp hairpin bend, as shown more clearly in Figures 1 and 3, the belt being guided over an adjustable guide 19 and passing over pulley 20 driven by the motor 11. This guide 19 may be adjusted by the threaded means 21 so as to provide the proper tension on the belt. This belt is of a desired width which in this instance is sufficient to be contacted by a roller having four different sections making up the jaw 25.

The other of the jaws 25 comprises a plurality of roller sections each of which is shown in perspective at 26, having an edge or peripheral surface 27 to engage the belt 18, as shown in Figures 1 or 3, the position being such that the belt will have a hairpin turn over the guide 17. Each of these sections 26 is provided with a square opening 28 to fit upon a square shaft 29 which is driven by belt 30 extending over a pulley 31 fixed on this shaft 29 and over a pulley 32 on the armature shaft of the motor 11. The peripheral surface 27 engaging the belt 18 will be such as to draw feathers from the bird as the feathers are caught between the belt and this surface 27 and cause transfer of these feathers sufficiently to discharge them into the suction conduit 12 where they will be conveyed from the machine. The feathers are maintained under control by this long surface engagement between the belt and the peripheral surface 27.

This roller section is made of resilient elastic rubber and is molded or cut out to form a recess 33 and also formed with a finger 34 which extends radially outwardly beyond the peripheral surface 27 and is arcuate on its edge 35 of a radius substantially the radius of the belt as it extends over the guide 17 so that the end 36 of this finger 34 will reach around the curved belt engaging surface and grip short feathers close to the skin of the bird. As the roller and belt advance and contact with each other, the finger 34 will be flexed back into the recess 33 to receive it while maintaining its engagement with the surface of the belt and its grip upon the feathers which are plucked until they are released to be conveyed by the belt into the suction conduit 12.

A plurality of these roller sections 26 are provided with their openings 28 so arranged that when positioned upon the shaft 29 the fingers 34 will be staggered with relation to each other, as shown in the end view in Figure 3. This assembly may be made upon the square shaft 29 against a flange 37 with spacers 38 between the sections 26. A securing member in the form of a pulley 31 is screwed onto the shaft portion 40 to hold the parts assembled. The shaft may be mounted in the framework 41 at one end and 42 at the other end by means of ball bearings 43 and 44, the shaft being driven by the belt 31 as above described.

In some cases the roller sections may be modified, some of which are in the shapes shown in Figure 8 at 50; each section 50 has a work-engaging surface 51 to contact the belt, as did the surface 27 of the roller 26 above described. A square opening 52 is provided to fit upon a square shaft, as above indicated. However, in place of the fingers 34, above described, separate fingers designated generally 53 and shown in perspective in Figure 10 are provided and a pair are mounted upon each of two discs 54 (see Figure 9) one at each end of the roller by means of a pivot 55 carried by the disc and extending through the opening 56 in the finger. A spring 63 urges the finger clockwise about the pivot. A cam 57 is fixed to the framework 42 and a cam follower comprising a rubber roller 58 is mounted by means of pin 59 in opening 60 at one end of the finger 53 to be urged to contact the cam by the spring 63. The other end of the arm is provided with an arcuate or semi-cylindrical gripping portion 61 which extends laterally from the finger and may be separably secured thereto by means of a screw 62. The concave surface of this finger portion 61 will engage the belt at the location of the guide 17 so as to grip the feathers, it being spring-urged by means of spring 63 encircling the pivot 55. As the roller and belt advance, however, the finger will swing so that the gripping portion 61 will lodge in a recess 64 in the roller section 50 and in a recess 66 in the disc 54. In the case, however, of the finger which has the longer gripping surface 61' to extend across the outer section 50 to the inner section 50', the finger 61' when moved rearwardly will extend in a recess in the roll 50' and also in a second recess 65 in the first roller 50 and in a second recess 70 in the disc 54 for clearance from the belt. Each of these sections 50 is mounted on the shaft in such position by means of the relation of the square opening that the engaging fingers 61 will be staggered so that no two of these will engage the belt in a gripping relation at the same time.

In order that the contact of the fingers 53 with the belt at the guide 17 may be softened somewhat, I have provided a cam 57 which has a high spot 67 thereon to engage the cam follower 58 and move the arm rearwardly just prior to its contact with the belt and guide 17 so that the rapid rotation of the roll will not serve to injure the arm at its point of gripping. The plate 54 is duplicated at the opposite end of the roller assembly in a reverse relation so that its fingers will extend over the outer roll 50 and the inner roll 50' in the same relation as described with respect to the other end of the roll gripping device. A pulley 68 assembled on the shaft 69 will be used for driving this assembly from the motor 11 and is mounted on the framework as is the roller in Figure 2. In some cases the concave end of the finger 61 will be provided with a rubber face 71 for engaging the belt or other jaw of the gripping mechanism.

I claim:

1. A machine for plucking feathers from a bird comprising a pair of jaws between which feathers are gripped to be pulled from the bird being plucked, one of said jaws comprising a curved guide with a movable belt disposed in a hairpin bend thereover, the other jaw comprising a rotatable roller positioned at a location to have its peripheral surface engage said belt adjacent said guide, said roller being provided with fingers extending from the periphery thereof and arched at their ends and movable into engagement with said belt at the location of the hairpin bend upon the rotation of said roller to press said belt against said guide, said fingers being resiliently mounted and said roller having recesses to receive said fingers as moved to pass said other jaw.

2. A machine as in claim 1 wherein said roller comprises a plurality of sections with their fingers in staggered relation for engaging the other jaw in sequence.

3. A machine as in claim 1 wherein the roller is of resilient rubber-like material and the fingers are of the same piece of material.

4. A machine as in claim 1 wherein the roller is of resilient rubber-like material and the fingers are of a separate piece of material movably mounted thereon.

5. A machine as in claim 1 wherein the roller is of resilient rubber-like material and the fingers are of a separate piece of material pivotally mounted thereon.

6. A machine as in claim 1 wherein the roller is of resilient rubber-like material and the fingers are of a separate piece of material pivotally mounted thereon and a cam swings said fingers reversely of their direction of motion.

FOSTER FISHER.

REFERENCES CITED

The following references are of record in the file of this patent:

UNITED STATES PATENTS

| Number | Name | Date |
|---|---|---|
| 1,714,595 | Ferrier | May 28, 1929 |
| 1,980,034 | Budd et al. | Nov. 6, 1934 |

FOREIGN PATENTS

| Number | Country | Date |
|---|---|---|
| 11,143 | Great Britain | 1887 |
| 23,524 | Great Britain | Oct. 23, 1906 |